(12) United States Patent
Fischinger et al.

(10) Patent No.: US 9,168,591 B2
(45) Date of Patent: Oct. 27, 2015

(54) CORE DRILLING MACHINE

(75) Inventors: Manuela Fischinger, Murrhardt (DE); Nicasio Garifo, Metzingen (DE); Stefan Scherrenbacher, Waldstetten (DE)

(73) Assignee: C. & E. Fein GmbH (DE)

( * ) Notice: Subject to any disclaimer, the term of this patent is extended or adjusted under 35 U.S.C. 154(b) by 489 days.

(21) Appl. No.: 13/533,539

(22) Filed: Jun. 26, 2012

(65) Prior Publication Data

US 2013/0004255 A1 Jan. 3, 2013

(30) Foreign Application Priority Data

Jun. 30, 2011 (DE) .......................... 10 2011 106 054

(51) Int. Cl.
*B23B 45/00* (2006.01)
*B23B 39/00* (2006.01)
*B25H 1/00* (2006.01)

(52) U.S. Cl.
CPC ........... *B23B 39/00* (2013.01); *B23B 2251/428* (2013.01); *B23B 2260/036* (2013.01); *B23B 2260/068* (2013.01); *B25H 1/0064* (2013.01); *B25H 1/0071* (2013.01); *Y10T 408/5647* (2015.01); *Y10T 408/675* (2015.01)

(58) Field of Classification Search
CPC .............. B25H 1/0071; B25H 1/0064; Y10T 408/554; Y10T 408/5647; B23B 2251/428
USPC ............................. 408/76, 136, 135, 111, 129
See application file for complete search history.

(56) References Cited

U.S. PATENT DOCUMENTS

| | | | |
|---|---|---|---|
| 4,380,182 A | 4/1983 | Bredow et al. | |
| 5,035,549 A * | 7/1991 | Asano et al. | 408/132 |
| 5,126,643 A | 6/1992 | French | |
| 5,415,503 A * | 5/1995 | Strange et al. | 408/76 |
| 6,072,675 A | 6/2000 | Murakami et al. | |
| D472,251 S * | 3/2003 | Shimada | D15/132 |
| D560,234 S * | 1/2008 | Shimada | D15/132 |
| D591,318 S * | 4/2009 | Shimada | D15/132 |
| 2009/0028653 A1* | 1/2009 | Wilbert et al. | 408/76 |

FOREIGN PATENT DOCUMENTS

| | | |
|---|---|---|
| DE | 3005613 C2 | 6/1984 |
| DE | 4344635 A1 | 8/1995 |
| DE | 69729226 T2 | 9/2004 |
| DE | 102007036233 A1 | 2/2009 |
| DE | 102008034773 A1 | 3/2009 |
| EP | 0554017 A1 | 8/1993 |
| GB | 2311028 A | 9/1997 |
| WO | 2007108745 A1 | 9/2007 |

\* cited by examiner

*Primary Examiner* — Eric A Gates
*Assistant Examiner* — Paul M Janeski
(74) *Attorney, Agent, or Firm* — St. Onge Steward Johnston & Reens LLC

(57) ABSTRACT

Disclosed is a core drilling machine, comprising a stand part for fixing the core drilling machine to a component, and comprising, on the stand part, a guide along which a core drilling unit is carried in a movable manner, the stand part having a stand housing, on an outside face of which the guide is carried, and the core drilling unit having an elongate machine housing, which is carried so as to be movable along the guide by means of a slide, and comprising a cable, which, together with a protective sleeve, is routed from the stand part to the core drilling unit, the cable being routed from the stand housing to the core drilling unit via a flexible protective sleeve and being carried on the core drilling unit by means of a swivelling rotary joint.

10 Claims, 3 Drawing Sheets

CORE DRILLING MACHINE

CROSS REFERENCES TO RELATED APPLICATIONS

This application claims priority from German patent application 10 2011 106 054.9, filed on Jun. 30, 2011. The entire contents of this priority application is incorporated herein by reference.

BACKGROUND OF THE INVENTION

The invention relates to a core drilling machine, comprising a stand part for fixing the core drilling machine to a component, and comprising, on the stand part, a guide along which a core drilling unit is carried in a movable manner, the stand part having a stand housing, on an outside face of which the guide is carried, and the core drilling unit having an elongate machine housing, which is carried so as to be movable along the guide by means of a slide, and comprising a cable, which is routed from the stand part to the core drilling unit.

Such a core drilling machine is known, for example, from EP 0 554 017 A1. In that case, the cable runs from the stand part to an end of the slide, on which the core drilling unit is carried, in a relatively extensive loop.

A disadvantage in that case is the cable routing, which is liable to damage and/or is subject to a very high kinking load.

SUMMARY OF THE INVENTION

In view of this, it is a first object of the invention to disclose a core drilling machine in which the routing of the cable offers little possible inconvenience.

It is a second object of the invention to disclose a core drilling machine which is subject to little possible kinking loads.

It is a third object of the invention to disclose a core drilling machine which is very durable and reliable.

It is a forth object of the invention to disclose a core drilling machine wherein the risk of damage to the cable between the core drilling unit and the stand is reduced.

According to one aspect of the invention these and other objects are achieved by core drilling machine, comprising:

a stand part for fixing the core drilling machine to a component;

a guide arranged on said stand part;

a core drilling unit having an elongate machine housing and a slide being movable along said guide;

a stand housing enclosing part of said stand part and having an outside face supporting said guide;

a cable which is carried on said core drilling unit by means of a swivelling rotary joint, said cable having a flexible protective sleeve being routed from said stand part to said core drilling unit.

This is because, according to the invention, the carrying of the cable on the core drilling unit by means of a swivelling rotary joint provides for a very short cable routing, with the bending load being minimized at the same time. This provides for a very compact design and, at the same time, minimizes the risk of damage to the cable.

According to a further aspect of the invention, the machine housing has a motor housing part, in which a motor is carried, and has a transmission housing part, on which a tool receiver is provided, the cable, together with the protective sleeve, being carried on the motor housing part by means of the swivelling rotary joint.

In this way, the cable routing is shortened and the ability of the slide to move on the guide is taken into account.

According to a further design of the invention, carried at the upper end of the stand housing there is a handle bow, through which the cable extends, together with the protective sleeve.

In this way, the cable is securely fixed in position and protected against damage resulting from unintentional contact.

According to a further design of the invention, the stand housing has two lateral faces, the cable, together with the protective sleeve, extending out from the stand housing, centrally between the two lateral faces.

Owing to this central routing of the cable, the latter offers particularly little encumbrance when in use.

According to a further design of the invention, the rotary joint is carried at the axial end of the motor housing.

In an alternative realization of the invention, the rotary joint is carried on a lateral face of the motor housing that faces towards the guide.

In the case of both designs, a particularly favourable routing of the cable is achieved.

According to a further design of the invention, the rotary joint is carried centrally on the motor housing part in relation to the stand housing.

Because of such a central cable routing from the stand part to the motor housing, the cable runs in a securely protected manner and offers the least possible interference.

It is understood that the features of the invention that are mentioned above and those to be explained in the following can be applied, not only in the respectively specified combination, but also in other combinations of the invention, or independently.

BRIEF DESCRIPTION OF THE DRAWINGS

Further features and advantages of the invention are given by the following description of preferred exemplary embodiments, with reference to the drawing, wherein.

DESCRIPTION OF THE PREFERRED EMBODIMENTS

Figure 1:
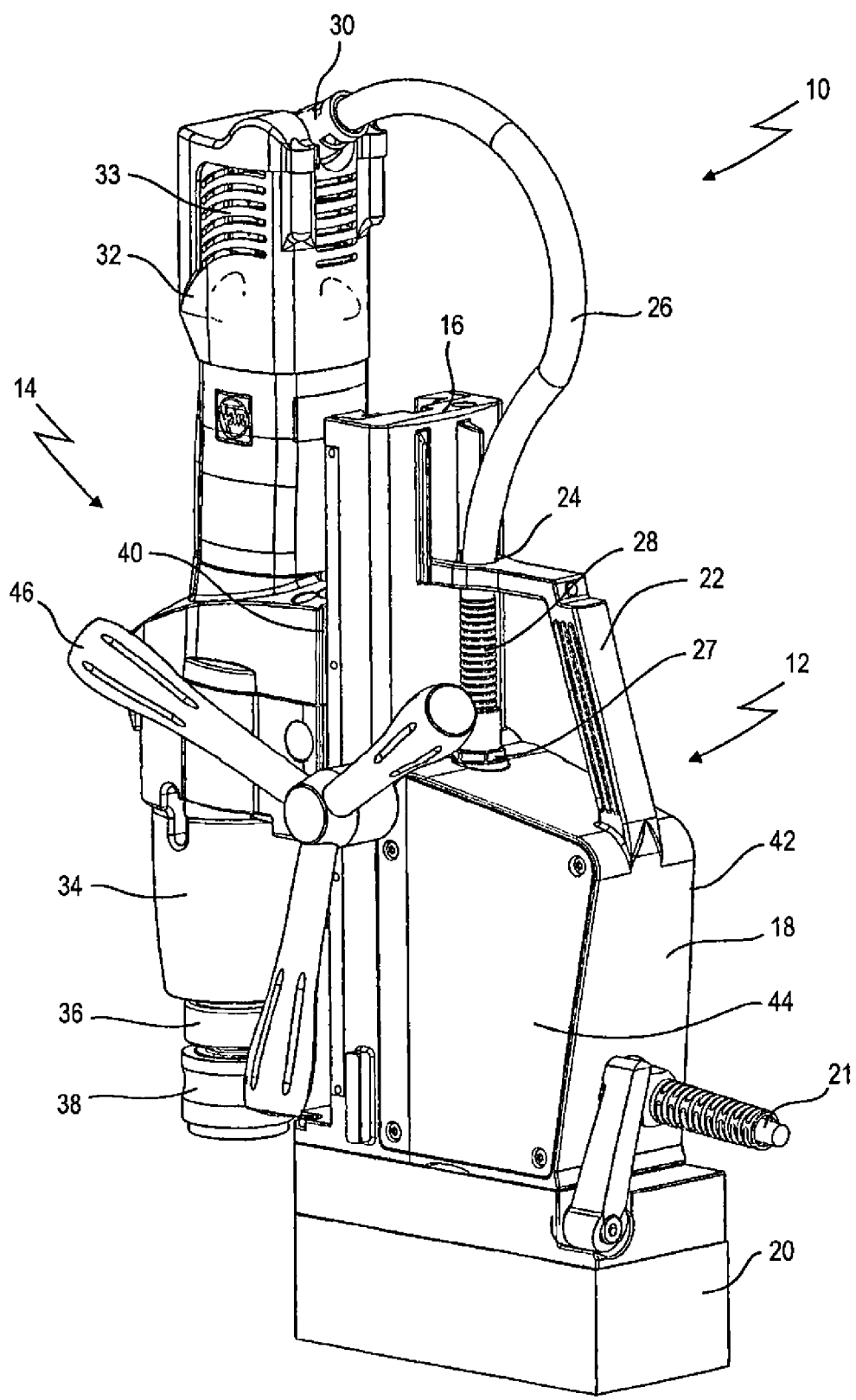
FIG. 1 shows a perspective representation of a core drilling machine according to the invention, in a first configuration.
Figure 2:
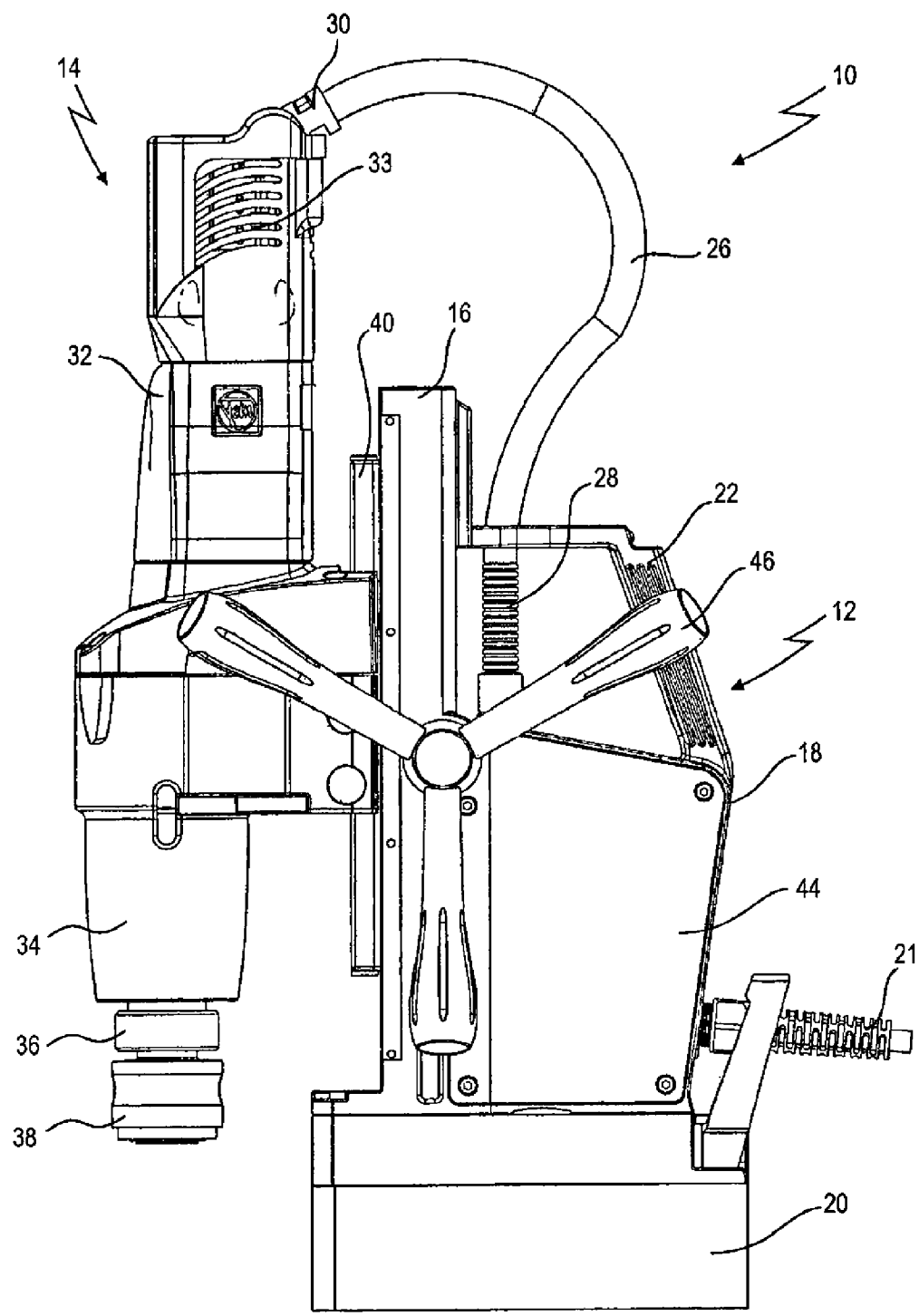
FIG. 2 shows a side view of the core drilling machine according to FIG. 1.

In FIGS. 1 and 2, a core drilling machine according to the invention is represented in a perspective view and in a side view, respectively, and denoted as a whole by the numeral 10.

The core drilling machine 10 has a stand part 12, which comprises a magnetic foot 20 and which comprises guide 16, along which a core drilling unit 14 can be moved by means of a slide 40. A cable 26 serves to effect a connection between the stand part 12 and the core drilling unit 14.

The core drilling unit 14 has an elongate machine housing that, at the upper end, has a motor housing part 32, from which a transmission housing part 34 extends downwards. Carried in the motor housing part 32 there is a motor, which is denoted by the numeral 33. The motor drives a transmission, which is carried in the transmission housing part 34 and which, at its lower end, is provided with a coupling nut 36 for a core drilling tool receiver 38.

Carried on the magnetic foot 20, on the stand part 12, there is a stand housing 18, on an outside face of which the guide 16 is provided, and at the upper end of which a handle bow 22 is provided, which extends out from an outer end of the stand housing 18 to a rear side of the guide 16. Control electronics, for controlling the core drilling machine, are carried in the stand housing 18. In addition, FIGS. 1 and 2 also show a connection cable 21, via which the core drilling machine 10 is supplied with mains voltage.

From a cable outlet 27 at the upper end of the stand housing 12, the cable 26 extends centrally between the two lateral faces 42, 44 of the stand housing 18, being routed out, in a flexible protective sleeve 28, through a passage 24 in the handle part 22, so as to be directly adjacent to the rear side of the guide 16, in a slight arc to the outer end of the motor housing 32, where it is fixed centrally in relation to the guide 16, i.e. fixed between the two lateral faces of the motor housing 32, by means of a rotary joint 30.

This arrangement and fastening of the cable 26 results in a particularly short cable routing, a secure cable run and little bending load as the core drilling unit 14 is moved along the guide 16.

In addition, FIGS. 1 and 2 also show a lever 46, which can be used to manually effect advancing of the core drilling unit 14 during the core drilling operation if automatic operation is not selected.

Figure 3:
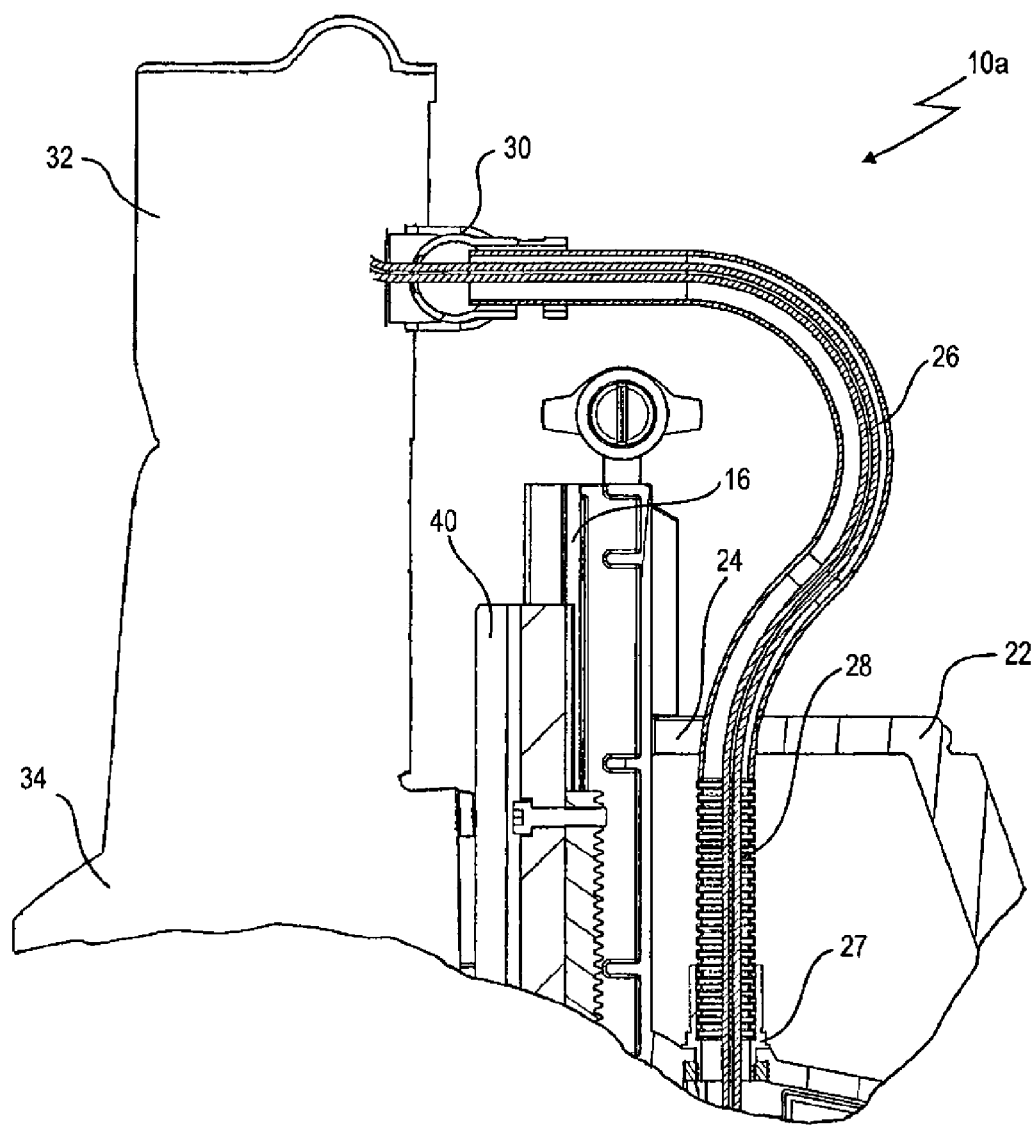
FIG. 3 shows a partial section through a core drilling machine in a configuration that has been modified in comparison with FIGS. 1 and 2, the partial section showing the cable routing.

FIG. 3 shows a slightly modified configuration of the core drilling machine, represented as a whole by the numeral 10*a*. In this case, parts that correspond are denoted by corresponding reference numerals.

The only difference in comparison with the configuration explained previously with reference to FIGS. 1 and 2 consists in that the rotary joint 30 is not carried at the axial end of the motor housing 32, but is carried, offset somewhat in the direction towards the transmission housing 34, centrally between the two lateral faces of the motor housing 32.

In this way, likewise, a favourable cable routing is achieved.

Owing to the partially sectional representation, FIG. 3 also shows the cable 26 itself, which is routed inside the flexible protective sleeve 28 that runs between the rotary joint 30 and the cable outlet 27 and that also comprises an additional plastic grommet at the cable outlet 27.

What is claimed is:

1. A core drilling machine, comprising:
    a stand part for fixing the core drilling machine to a component;
    a guide arranged on said stand part;
    a core drilling unit having an elongate machine housing and a slide being movable along said guide;
    a stand housing enclosing part of said stand part and having an outside face supporting said guide;
    a swivelling rotary joint supporting a cable on said core drilling unit; and
    a flexible protective sleeve being routed from said stand part to said core drilling unit;
    wherein said machine housing further comprises:
    a motor housing part wherein a motor is received;
    a handle bow comprising an upper part extending from said guide, and a lower part received at an upper end of said stand housing, said upper part comprising an opening through which said cable together with said protective sleeve extends substantially perpendicularly to said upper part;
    and a transmission housing part, whereon a tool receiver is provided; and
    wherein said cable, together with said protective sleeve, is carried on said motor housing part by means of said swivelling rotary joint extending laterally from said motor housing.

2. The core drilling machine of claim 1, wherein said stand housing comprises two lateral faces, and wherein said cable, together with said protective sleeve, extends out from said stand housing, centrally between said two lateral faces.

3. The core drilling machine of claim 1, wherein said rotary joint is supported at an axial end of said motor housing.

4. The core drilling machine of claim 1, wherein said rotary joint is supported on a lateral face of said motor housing that faces towards said guide.

5. The core drilling machine of claim 1, wherein said rotary joint is received on said motor housing part centrally in relation to said stand housing.

6. A core drilling machine, comprising:
    a stand part for fixing the core drilling machine to a component;
    a guide arranged on said stand part;
    a core drilling unit having an elongate machine housing and a slide being movable along said guide;
    a stand housing enclosing part of said stand part and having an outside face supporting said guide;
    a swivelling rotary joint supporting a cable on said core drilling unit; and
    a flexible protective sleeve being routed from said stand part to said core drilling unit;
    wherein said machine housing further comprises:
    a motor housing part wherein a motor is received;
    a handle bow extending from said guide, said handle bow comprising an opening passing through a wall thereof adjacent to the guide,
    wherein said cable together with said protective sleeve extend through the opening through the wall of the handle bow, whereby said cable is routed so as to be directly adjacent to a rear side of the guide;
    and a transmission housing part, whereon a tool receiver is provided; and
    wherein said cable, together with said protective sleeve, is carried on said motor housing part by means of said swivelling rotary joint extending laterally from said motor housing.

7. The core drilling machine of claim 6, wherein said stand housing comprises two lateral faces, and wherein said cable, together with said protective sleeve, extends out from said stand housing, centrally between said two lateral faces.

8. The core drilling machine of claim 6, wherein said rotary joint is supported at an axial end of said motor housing.

9. The core drilling machine of claim 6, wherein said rotary joint is supported on a lateral face of said motor housing that faces towards said guide.

10. The core drilling machine of claim 6, wherein said rotary joint is received on said motor housing part centrally in relation to said stand housing.

* * * * *